United States Patent
Chang et al.

(10) Patent No.: US 8,514,193 B2
(45) Date of Patent: Aug. 20, 2013

(54) TOUCH SENSING METHOD AND TOUCH SENSING SYSTEM

(75) Inventors: Hui-Hung Chang, Keelung (TW);
Hsieh-Yi Wu, Hsinchu County (TW);
Meng-Hsiu Wu, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 321 days.

(21) Appl. No.: 13/081,517

(22) Filed: Apr. 7, 2011

(65) Prior Publication Data
US 2011/0316794 A1      Dec. 29, 2011

(30) Foreign Application Priority Data

Jun. 23, 2010   (TW) .............................. 99120453 A

(51) Int. Cl.
*G06F 3/041* (2006.01)
(52) U.S. Cl.
USPC ........................................................ 345/173
(58) Field of Classification Search
USPC ................................. 345/173–183
See application file for complete search history.

(56) References Cited

U.S. PATENT DOCUMENTS

| 2005/0093831 | A1 | 5/2005 | Wang |
| 2010/0110031 | A1 | 5/2010 | Miyazawa et al. |
| 2010/0271322 | A1* | 10/2010 | Kondoh et al. ................ 345/173 |
| 2010/0315361 | A1* | 12/2010 | Wang et al. .................... 345/173 |

FOREIGN PATENT DOCUMENTS

JP      2009245402      10/2009

OTHER PUBLICATIONS

"First Office Action of China counterpart application" issued on Jan. 4, 2013, p. 1-p. 5, in which the listed references were cited.

* cited by examiner

*Primary Examiner* — Kevin M Nguyen
(74) *Attorney, Agent, or Firm* — Jianq Chyun IP Office

(57) ABSTRACT

A touch sensing system including a touch interface and a processing unit is provided. The touch interface has multiple independent touch blocks. The processing unit is coupled to the touch interface. The processing unit includes an interpolating unit. The interpolating unit interpolates multiple spacing points between two adjacent touch blocks along a first direction to generate multiple first coordinate values. The processing unit determines a central block according to a threshold value and sensing values corresponding to the touch blocks, selects at least one touch block adjacent to the central block as a peripheral block, and determines a touch position on the touch interface according to the number of the spacing points, the sensing value corresponding to the peripheral block, a position of the peripheral block, the sensing value corresponding to the central block, and a position of the central block.

24 Claims, 9 Drawing Sheets

TOUCH SENSING METHOD AND TOUCH SENSING SYSTEM

CROSS-REFERENCE TO RELATED APPLICATION

This application claims the priority benefit of Taiwan application serial no. 99120453, filed on Jun. 23, 2010. The entirety of the above-mentioned patent application is hereby incorporated by reference herein and made a part of this specification.

BACKGROUND

1. Field of the Invention

The present invention relates to a sensing method and a sensing system. More particularly, the present invention relates to a touch sensing method and a touch sensing system.

2. Description of Related Art

In today's information age, people increasingly depend on electronic products. The electronic products such as notebook computers, mobile phones, personal digital assistants (PDAs), digital Walkmans, etc. have become indispensable application tools in people's daily life. The above electronic products respectively have an input interface, and a user can input a command through the input interface, so that an internal system of the electronic product can execute such command.

To provide a more humanistic operation mode, an input interface such as a touch pad or a touch panel is generally configured to an electronic apparatus, so that the user can input commands through the touch pad or the touch panel. The touch device in the market, for example, a capacitive touch device, generally requires a fine coordinate system. Generally, in a conventional method, two layers of sensing strings arranged in different directions are configured on the touch interface to implement a fine X-Y coordinate system. However, since a fabrication process based on such method is rather complicated, a single-layer layout technique with a relatively simple fabrication process is developed.

However, regarding the capacitive touch device using the single-layer layout technique, to avoid a low touch sensitivity thereof caused by excessive small sensing signal variation of a sensing point, in the conventional technique, a touch area of each touch point is designed to be relatively large. Therefore, the number of the touch points is limited, and in case of inadequate touch points, accuracy for determining a touch position is decreased.

SUMMARY

The invention is directed to a touch sensing method, by which an interpolation method is used to generate a plurality of touch coordinate values, so as to improve accuracy for determining a touch position.

The invention is directed to a touch sensing system, in which an interpolation method is used to generate a plurality of touch coordinate values, so as to improve accuracy for determining a touch position.

The invention provides a touch sensing method adapted to a touch sensing system. The touch sensing system includes a touch interface having a plurality of independent touch blocks. The touch sensing method can be described as follows. A plurality of spacing points is interpolated between two adjacent touch blocks along a first direction, so as to generate a plurality of first coordinate values along the first direction, wherein the spacing points and the touch blocks respectively correspond to the first coordinate values. A central block is determined according to a threshold value and sensing values corresponding to the touch blocks, and at least one touch block adjacent to the central block is selected as a peripheral block. A touch position on the touch interface is determined according to the number of the spacing points, the sensing value corresponding to the peripheral block, a position of the peripheral block, the sensing value corresponding to the central block, and a position of the central block.

In an exemplary embodiment of the invention, a method of determining the central block includes following steps. The sensing values corresponding to the touch blocks are sequentially detected along a single direction. It is determined whether the sensing value corresponding to each of the touch blocks is greater than the threshold value. When the sensing value corresponding to one of the touch blocks is greater than the threshold value, the touch block is defined as the central block.

In an exemplary embodiment of the invention, the touch sensing method further includes dividing the touch blocks into a first group of touch block and a second group of touch block based on the central block and the touch blocks arranged along a second direction, wherein the sensing values corresponding to the touch blocks in the first group of touch block and the sensing values corresponding to the touch blocks in the second group of touch block respectively correspond to inversed operation symbols.

In an exemplary embodiment of the invention, a method of calculating the touch position includes following steps. It is determined whether the peripheral block is belonged to the first group of touch block or the second group of touch block, so as to determine an operation symbol corresponding to the peripheral block. The touch position on the touch interface is determined according to the number of the spacing points, the sensing value corresponding to the peripheral block, the operation symbol corresponding to the peripheral block, the sensing value corresponding to the central block, and the first coordinate value corresponding to the central block.

In an exemplary embodiment of the invention, the touch sensing method further includes calculating the touch position on the touch interface according to a scale factor corresponding to the peripheral block.

In an exemplary embodiment of the invention, the touch sensing method further includes interpolating a plurality of spacing points between two adjacent touch blocks along a second direction, so as to generate a plurality of second coordinate values along the second direction, wherein the spacing points and the touch blocks respectively correspond to the second coordinate values.

In an exemplary embodiment of the invention, the touch sensing method further includes dividing the touch blocks into a third group of touch block and a fourth group of touch block based on the central block and the touch blocks arranged along the first direction, wherein the sensing values corresponding to the touch blocks in the third group of touch block and the sensing values corresponding to the touch blocks in the fourth group of touch block respectively correspond to inversed operation symbols.

In an exemplary embodiment of the invention, a method of calculating the touch position includes following steps. It is determined whether the peripheral block is belonged to the third group of touch block or the fourth group of touch block, so as to determine an operation symbol corresponding to the peripheral block. The touch position on the touch interface is determined according to the number of the spacing points, the sensing value corresponding to the peripheral block, the operation symbol corresponding to the peripheral block, the sensing value corresponding to the central block, and the second coordinate value corresponding to the central block.

In an exemplary embodiment of the invention, the touch sensing method further includes calculating the touch position on the touch interface according to a scale factor corresponding to the peripheral block.

On the other hand, the invention provides a touch sensing system including a touch interface and a processing unit. The touch interface has a plurality of independent touch blocks. The processing unit is coupled to the touch interface. The processing unit includes an interpolating unit. The interpolating unit interpolates a plurality of spacing points between two adjacent touch blocks along a first direction, so as to generate a plurality of first coordinate values along the first direction. The spacing points and the touch blocks respectively correspond to the first coordinate values. The processing unit determines a central block according to a threshold value and sensing values corresponding to the touch blocks, and selects at least one touch block adjacent to the central block as a peripheral block, and determines a touch position on the touch interface according to the number of the spacing points, the sensing value corresponding to the peripheral block, a position of the peripheral block, the sensing value corresponding to the central block, and a position of the central block.

In an exemplary embodiment of the invention, the processing unit further includes a detecting unit. The detecting unit sequentially detects the sensing values corresponding to the touch blocks along a single direction, and determines whether the sensing value corresponding to each of the touch blocks is greater than the threshold value. If the sensing value corresponding to one of the touch blocks is greater than the threshold value, the processing unit defines the touch block as the central block.

In an exemplary embodiment of the invention, the sensing value corresponding to the central block is the maximum among the sensing values corresponding to the touch blocks.

In an exemplary embodiment of the invention, the processing unit divides the touch blocks into a first group of touch block and a second group of touch block based on the central block and the touch blocks arranged along a second direction, wherein the sensing values corresponding to the touch blocks in the first group of touch block and the sensing values corresponding to the touch blocks in the second group of touch block respectively correspond to inversed operation symbols.

In an exemplary embodiment of the invention, the processing unit determines whether the peripheral block is belonged to the first group of touch block or the second group of touch block, so as to determine an operation symbol corresponding to the peripheral block, and determines the touch position on the touch interface according to the number of the spacing points, the sensing value corresponding to the peripheral block, the operation symbol corresponding to the peripheral block, the sensing value corresponding to the central block, and the first coordinate value corresponding to the central block.

In an exemplary embodiment of the invention, the operation symbol corresponding to the touch blocks in the first group of touch block is a plus sign, and the operation symbol corresponding to the touch blocks in the second group of touch block is a minus sign.

In an exemplary embodiment of the invention, the interpolating unit further interpolates a plurality of spacing points between two adjacent touch blocks along a second direction, so as to generate a plurality of second coordinate values along the second direction, wherein the spacing points and the touch blocks respectively correspond to the second coordinate values.

In an exemplary embodiment of the invention, the processing unit divides the touch blocks into a third group of touch block and a fourth group of touch block based on the central block and the touch blocks arranged along the first direction, wherein the sensing values corresponding to the touch blocks in the third group of touch block and the sensing values corresponding to the touch blocks in the fourth group of touch block respectively correspond to inversed operation symbols.

In an exemplary embodiment of the invention, the processing unit determines whether the peripheral block is belonged to the third group of touch block or the fourth group of touch block, so as to determine an operation symbol corresponding to the peripheral block, and determines the touch position on the touch interface according to the number of the spacing points, the sensing value corresponding to the peripheral block, the operation symbol corresponding to the peripheral block, the sensing value corresponding to the central block, and the second coordinate value corresponding to the central block.

In an exemplary embodiment of the invention, the operation symbol corresponding to the touch blocks in the third group of touch block is a plus sign, and the operation symbol corresponding to the touch blocks in the fourth group of touch block is a minus sign.

In an exemplary embodiment of the invention, the processing unit further calculates the touch position on the touch interface according to a scale factor corresponding to the peripheral block.

According to the above descriptions, in the touch sensing system of the embodiment of the invention, by interpolating a plurality of spacing points between two adjacent touch blocks to generate a plurality of coordinate values, the accuracy for determining the touch position is increased.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following exemplary embodiments, a touch panel and a user's finger are respectively taken as a touch interface and a touch object, though those skilled in the art should understand that the touch panel and the user's finger are not used to limit the touch interface and the touch object of the invention, and any input interface having a touch sensing function and any touch object are considered to be within the scope of the invention.

Figure 1A:
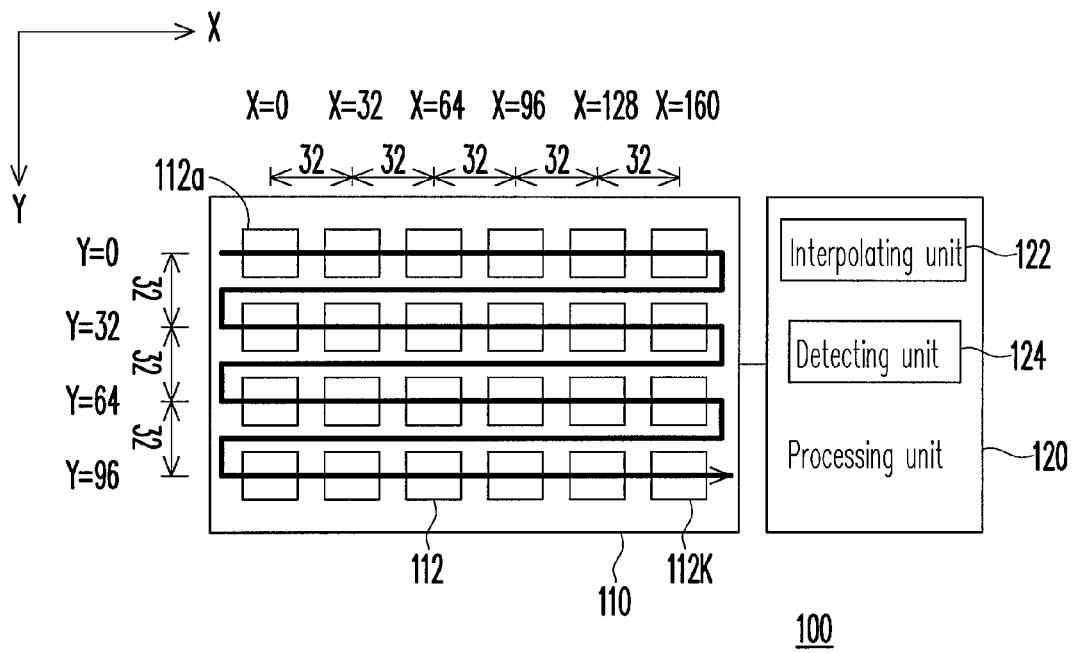
FIG. 1A is a schematic diagram illustrating a touch sensing system according to an exemplary embodiment of the invention.

FIG. 1A is a schematic diagram illustrating a touch sensing system according to an exemplary embodiment of the invention. The touch sensing system 100 includes a touch interface 110 and a processing unit 120. The touch interface 110 has a plurality of independent touch blocks 112 (24 touch blocks are schematically illustrated in FIG. 1A). Further, the touch blocks 112 are not mutually connected electrically, i.e. the touch blocks 112 are not sensing strings arranged along two directions and electrically connected along a same direction. In the present exemplary embodiment, the touch interface 110 is, for example, a touch panel of a touch display or a touch pad having a touch sensing function. Moreover, the touch blocks 112 are, for example, buttons formed by indium tin oxide (ITO) or other materials.

As shown in FIG. 1A, the processing unit 120 is coupled to the touch interface 110, and the processing unit 120 includes an interpolating unit 122. The interpolating unit 122 interpolates a plurality of spacing points between two adjacent touch blocks 112 along an X-direction, so as to generate a plurality of X coordinate values along the X-direction, wherein the spacing points and the touch blocks 112 respectively correspond to the X coordinate values. In detail, in the exemplary embodiment, a touch block 112a is taken as a start point, and 31 spacing points are interpolated along the X-direction between each two touch blocks 112 to generate 32 steps, so as to correspondingly generate the X coordinate values with a value range of 0-160 along the X-direction of the touch interface 110.

On the other hand, the interpolating unit 122 further interpolates a plurality of spacing points between two adjacent touch blocks 112 along a Y-direction, so as to generate a plurality of Y coordinate values along the Y-direction, wherein the spacing points and the touch blocks 112 respectively correspond to the Y coordinate values. Similarly, the interpolating unit 122 takes the touch block 112a as a start point to interpolate 31 spacing points along the Y-direction between each two touch blocks 112 to generate 32 steps, so as to correspondingly generate the Y coordinate values with a value range of 0-96 along the Y-direction of the touch interface 110. In this way, by using the above described interpolation method, the touch sensing system 100 can generate 161×97 touch coordinates based on only 24 touch blocks 112. It should be noticed that the number of the spacing points can be adjusted according to an actual usage requirement, which is not limited to the number shown in FIG. 1A. For example, in another exemplary embodiment, 63 spacing points can be interpolated between the touch blocks 112 to generate 64 steps, so that the touch sensing system 100 can generate 321×193 touch coordinates based on only 24 touch blocks 112.

Moreover, the processing unit 120 determines a central block according to a threshold value and sensing values corresponding to the touch blocks 112. In detail, the processing unit 120 further includes a detecting unit 124. The detecting unit 124 sequentially detects the sensing values corresponding to the touch blocks 112 along a single direction (for example, the X-direction), and determines whether the sensing value corresponding to each of the touch blocks 112 is greater than the threshold value. When the sensing value corresponding to one of the touch blocks 112 is greater than the threshold value, the processing unit 120 defines such touch block as the central block.

In other words, in the exemplary embodiment, the detecting unit 124 starts to detect the sensing values from the touch block 112a to a touch block 112k in a one-dimensional sequence. Namely, the detecting sequence is started from Y=0 and is sequentially developed to the touch block 112k of Y=96 along a +X direction. Alternatively, in another exemplary embodiment, the detecting sequence of the detecting unit 124 can also be started from X=0 and is sequentially developed to the touch block 112k of X=160 along a +Y direction. During the detecting process of the detecting unit 124, when the sensing value corresponding to one of the touch blocks 112 is greater than the threshold value, the processing unit 120 defines such touch block 112 as the central block.

Figure 1B:
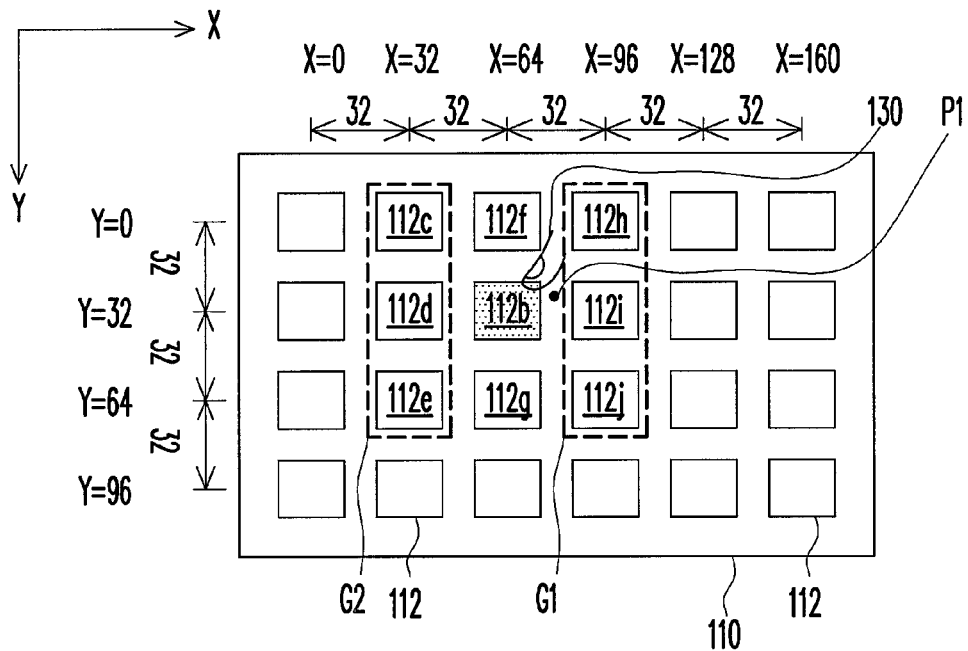
FIG. 1B is schematic diagram illustrating a contact between a user's finger and a touch interface.
Figure 1C:
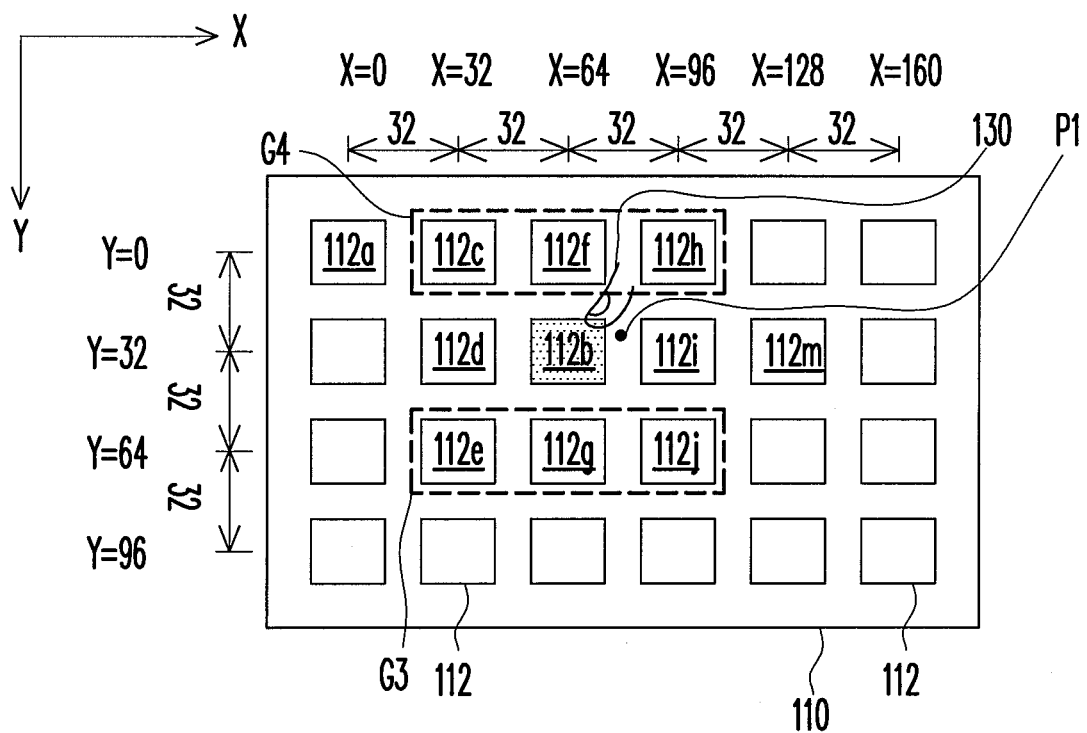
FIG. 1C is schematic diagram illustrating a contact between a user's finger and a touch interface.

FIG. 1B and FIG. 1C are schematic diagrams respectively illustrating a contact between a user's finger and the touch interface 110. Referring to FIG. 1B, when the finger 130 touches a position P1 adjacent to the touch block 112b, during the detecting process, the detecting unit 124, for example, detects that the sensing value corresponding to the touch block 112b is greater than the threshold value. Then, the processing unit 120 defines the touch block 112b as the central block. In the present exemplary embodiment, the sensing value corresponding to the central block 112b is, for example, the maximum sensing value in the sensing values corresponding to all of the touch blocks 112.

Then, the processing unit 120 selects at least one touch block adjacent to the central block 112b as a peripheral block. In the present exemplary embodiment, the peripheral blocks of the central block 112b are, for example, the touch blocks 112c-112j. Then, the processing unit 120 determines a touch position (i.e. the touch position P1) on the touch interface 110 according to the number of the spacing points (or the number of the steps), the sensing values corresponding to the peripheral blocks 112c-112j, positions of the peripheral block 112c-112j, the sensing value corresponding to the central block 112b, and a position of the central block 112b. In the present exemplary embodiment, the sensing values are, for example, capacitance induction variations, current variations or voltage variations of the touch blocks 112.

In detail, the processing unit 120 divides the touch blocks 112c-112j into a first group of touch block G1 and a second group of touch block G2 based on the central block 112b and the touch blocks 112f, 112b and 112g arranged along the Y-direction, wherein during a process of calculating the X coordinate of the touch position P1, the sensing values corresponding to the touch blocks 112h-112j in the first group of touch block G1 and the sensing values corresponding to the touch blocks 112c-112e in the second group of touch block G2 respectively correspond to inversed operation symbols. For example, in the present exemplary embodiment, the operation symbol corresponding to the touch blocks 112h-112j is, for example, a plus sign, and the operation symbol corresponding to the touch blocks 112c-112e is, for example, a minus sign. Moreover, the processing unit 120 can also calculate the touch position P1 on the touch interface 110 according to a scale factor corresponding to the peripheral blocks 112c-112j.

In detail, the X coordinate value $X_{P1}$ of the touch position P1 can be represented by a following equation (1):

$$X_{P1}=X_{cen}+(S_{112i}/S_{cen})(N/F1)-(S_{112d}/S_{cen})(N/F1)+(S_{112h}/S_{cen})(N/F2)-(S_{112e}/S_{cen})(N/F2)+(S_{112j}/S_{cen})(N/F3)-(S_{112e}/S_{cen})(N/F3) \quad (1)$$

In the equation (1), $X_{cen}$ is an X coordinate value corresponding to the central block 112b, i.e. 64. $S_{cen}$ is a sensing value corresponding to the central block 112b, and $S_{112c}$-$S_{112j}$ are respectively sensing values corresponding to the touch blocks 112c-112j. Further, $S_{cen}$ and $S_{112c}$-$S_{112j}$ are, for example, respectively capacitance induction variations, current variations or voltage variations of the touch blocks, 112b and 112c-112j. N represents the number of the steps, and in the present exemplary embodiment, N=32. Moreover, F1-F3 respectively represent the scale factors corresponding to the touch blocks 112c-112j, wherein F1, F2 and F3 are, for example, respectively 2, 4 and 8.

As shown in the equation (1), in the present exemplary embodiment, since the touch blocks 112h-112j are belonged to the first group of touch block G1, i.e. the touch blocks 112h-112j are located at a right side of the central block 112b, which correspond to positions with relatively great X coordinate values, in the equation (1), the operation symbol corresponding to the sensing values $S_{112h}$-$S_{112j}$ is the plus sign. Comparatively, since the touch blocks 112c-112e are belonged to the second group of touch block G2, i.e. the touch blocks 112c-112e are located at a left side of the central block 112b, which correspond to positions with a relatively small X coordinate values, the operation symbol corresponding to the sensing values $S_{112c}$-$S_{112e}$ is the minus sign. In this way, by executing plus and minus operations to the coordinate value $X_{cen}$ corresponding to the central block 112b and the sensing values corresponding to the touch blocks located at the left and right sides of the central block 112b, the X coordinate value $X_{P1}$ of the touch position P1 relative to the central block 112b can be accurately calculated, i.e. whether the touch position P1 is offset to the left or right of the central block 112b can be determined.

Similarly, referring to FIG. 1C, the processing unit 120 can also divide the touch blocks 112c, 112f, 112h, 112e, 112g and 112j into a third group of touch block G3 and a fourth group of touch block G4 based on the central block 112b and the touch blocks 112d, 112b and 112i arranged along the X-direction, wherein the sensing values corresponding to the touch blocks 112e, 112g and 112j in the third group of touch block G3 and the sensing values corresponding to the touch blocks 112c, 112f and 112h in the fourth group of touch block G4 respectively correspond to inversed operation symbols. For example, the operation symbol corresponding to the touch blocks 112e, 112g and 112j is, for example, the plus sign, and the operation symbol corresponding to the touch blocks 112c, 112f and 112h is, for example, the minus sign. Moreover, the processing unit 120 can also calculate the touch position P1 on the touch interface 110 according to a scale factor corresponding to the peripheral blocks 112c-112j.

Further, the Y coordinate value $Y_{P1}$ of the touch position P1 can be represented by a following equation (2):

$$Y_{P1}=Y_{cen}+(S_{112g}/S_{cen})(N/F1)-(S_{112f}/S_{cen})(N/F1)+(S_{112e}/S_{cen})(N/F2)-(S_{112c}/S_{cen})(N/F2)+(S_{112j}/S_{cen})(N/F3)-(S_{112h}/S_{cen})(N/F3) \quad (2)$$

In the equation (2), $Y_{cen}$ is a Y coordinate value corresponding to the central block 112b, i.e. 32. The other parameters are the same as that of the equation (1), so that detailed descriptions thereof are not repeated.

Referring to FIG. 1C again, since the touch blocks 112e, 112g and 112j are belonged to the third group of touch block G3, i.e. the touch blocks 112e, 112g and 112j are located below the central block 112b, which correspond to positions with relatively great Y coordinate values, in the equation (2), the operation symbol corresponding to the sensing values $S_{112e}$, $S_{112g}$ and $S_{112j}$ is the plus sign. Comparatively, since the touch blocks 112c, 112f and 112h are belonged to the fourth group of touch block G4, i.e. the touch blocks 112c, 112f and 112h are located above the central block 112b, which correspond to positions with relatively small Y coordinate values, the operation symbol corresponding to the sensing values $S_{112c}$, $S_{112f}$ and $S_{112h}$ is the minus sign. In this way, by executing plus and minus operations to the coordinate value $Y_{cen}$ corresponding to the central block 112b and the sensing values corresponding to the touch blocks located below and above the central block 112b, the Y coordinate value $Y_{P1}$ of the touch position P1 relative to the central block 112b can be accurately calculated, i.e. whether the touch position P1 is offset upwards or downwards relative to the central block 112b can be determined.

It should be noticed that in other exemplary embodiments, a designer can increase or decrease the number of the peripheral blocks according to a touch sensitivity of the touch interface 110. For example, the touch blocks 112c, 112e, 112h and 112j are not included in the coordinate calculation of the touch position P1. Alternatively, touch blocks 112a, 112m, etc. can be included in the coordinate calculation of the touch position P1. In other words, the designer can determine the number and positions of the peripheral blocks according to an actual design requirement, so as to calculate the touch position P1 of the finger 130. The number and the positions of the peripheral blocks are not limited as that shown in FIG. 1B and FIG. 1C.

Figure 2A:
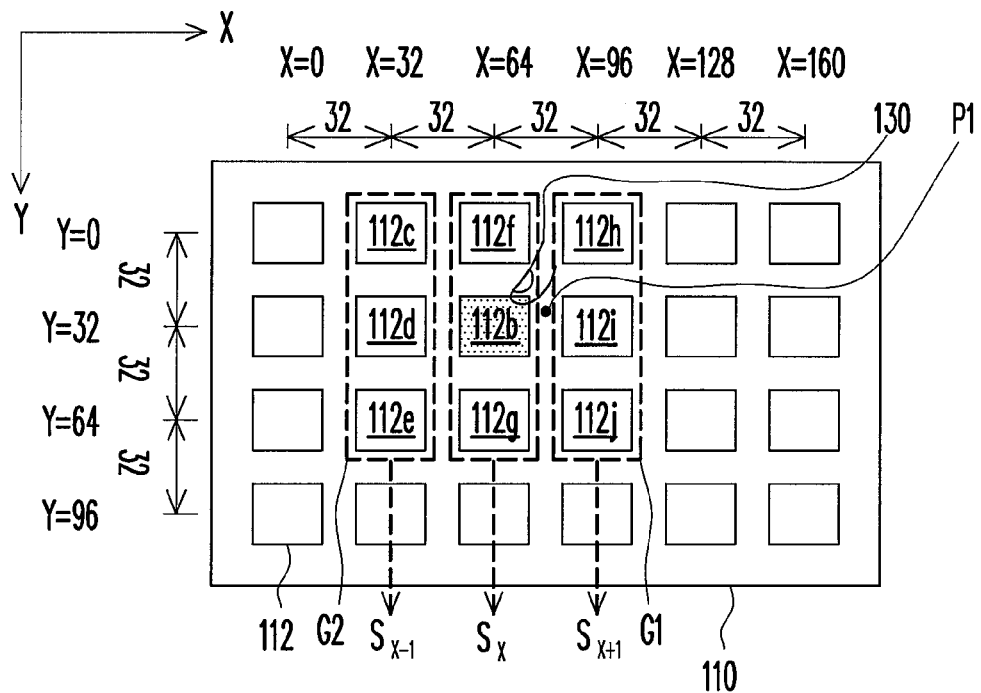
FIG. 2A is schematic diagram illustrating a method for calculating a touch position according to another exemplary embodiment of the invention.
Figure 2B:
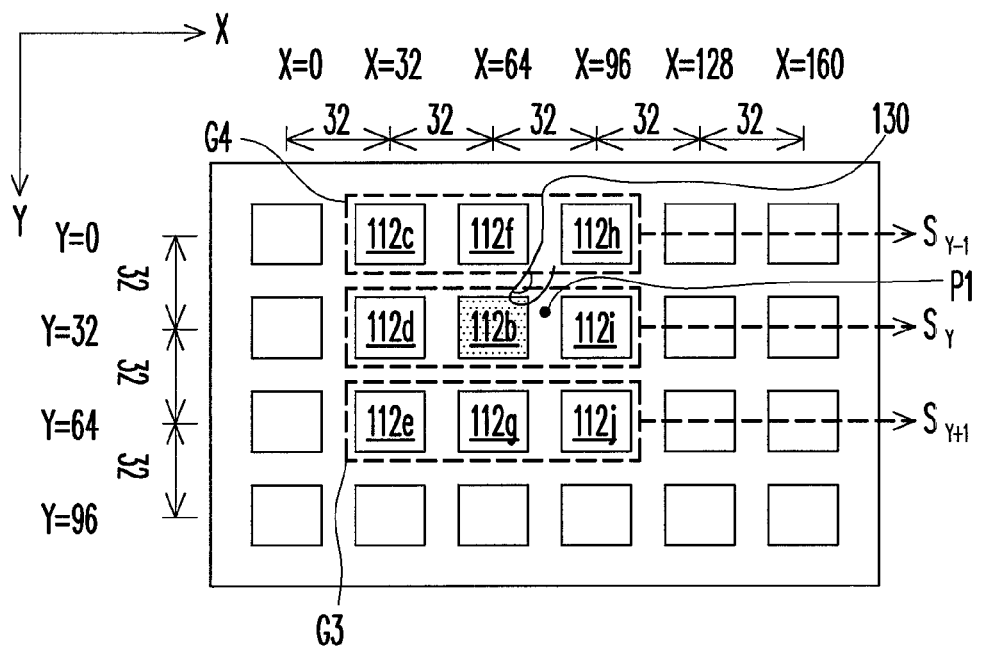
FIG. 2B is schematic diagram illustrating a method for calculating a touch position according to another exemplary embodiment of the invention.

FIG. 2A and FIG. 2B are schematic diagrams illustrating a method for calculating the touch position according to another exemplary embodiment of the invention. Referring to FIG. 2A, the X coordinate value $X_{P1}$ of the touch position P1 can be represented by a following equation (3):

$$X_{P1}=X_{cen}+(S_{X+1}/S_X)(N/2)-(S_{X-1}/S_X)(N/2) \quad (3)$$

Wherein, $X_{cen}$ is an X coordinate value corresponding to the central block 112b, i.e. 64. $S_{X+1}$ is an average of the sensing values $S_{112h}$, $S_{112i}$ and $S_{112j}$, i.e. $S_{X+1}=(S_{112h}+S_{112i}+S_{112j})/3$. $S_X$ is an average of the sensing values $S_{112f}$, $S_{112b}$ and $S_{112g}$, i.e. $S_X=(S_{112f}+S_{112b}+S_{112g})/3$. $S_{X-1}$ is an average of the sensing values $S_{112c}$, $S_{112d}$ and $S_{112e}$, i.e. $S_{X-1}=(S_{112c}+S_{112d}+$ $S_{112e}$)/3. N represents the number of the steps, and in the present exemplary embodiment, N=32.

The calculation method of FIG. 2A is similar to that of FIG. 1B, in the equation (3), since the touch blocks 112h-112j are belonged to the first group of touch block G1, i.e. the touch blocks 112h-112j are located at the right side of the central block 112b, the operation symbol corresponding to the average $S_{X+1}$ is the plus sign. Comparatively, since the touch blocks 112c-112e are belonged to the second group of touch block G2, i.e. the touch blocks 112c-112e are located at the left side of the central block 112b, the operation symbol corresponding to the sensing values $S_{X+1}$ is the minus sign. In this way, by executing plus and minus operations to the coordinate value $X_{cen}$ corresponding to the central block 112b and the average sensing values corresponding to the two groups of touch block located at the left and right sides of the central block 112b, the X coordinate value $X_{P1}$ of the touch position P1 relative to the central block 112b can be accurately calculated, i.e. whether the touch position P1 is offset to the left or right of the central block 112b can be determined.

Similarly, in FIG. 2B, the Y coordinate value $Y_{P1}$ of the touch position P1 can be represented by a following equation (4):

$$Y_{P1} = Y_{cen} + (S_{Y+1}/S_Y)(N/2) - (S_{Y-1}/S_Y)(N/2) \quad (4)$$

Wherein, $Y_{cen}$ is a Y coordinate value corresponding to the central block 112b, i.e. 32. $S_{Y+1}$ is an average of the sensing values $S_{112e}$, $S_{112g}$ and $S_{112j}$, i.e. $S_{Y+1} = (S_{112e} + S_{112g} + S_{112j})/3$. $S_Y$ is an average of the sensing values $S_{112d}$, $S_{112b}$ and $S_{112i}$, i.e. $S_Y = (S_{112d} + S_{112b} + S_{112i})/3$. $S_{Y-1}$ is an average of the sensing values $S_{112c}$, $S_{112f}$ and $S_{112h}$, i.e. $S_{Y-1} = (S_{112c} + S_{112f} + S_{112h})/3$. N represents the number of the steps, and in the present exemplary embodiment, N=32.

The calculation method of FIG. 2B is similar to that of FIG. 1C, in the equation (4), since the touch blocks 112e, 112g and 112j are belonged to the third group of touch block G3, i.e. the touch blocks 112e, 112g and 112j are located below the central block 112b, the operation symbol corresponding to the average $S_{Y+1}$ is the plus sign. Comparatively, since the touch blocks 112c, 112f and 112h are belonged to the fourth group of touch block G4, i.e. the touch blocks 112c, 112f and 112h are located above the central block 112b, the operation symbol corresponding to the average $S_{Y-1}$ is the minus sign. In this way, by executing plus and minus operations to the coordinate value $Y_{cen}$ corresponding to the central block 112b and the average sensing values corresponding to the two groups of touch block located below and above the central block 112b, the Y coordinate value $Y_{P1}$ of the touch position P1 relative to the central block 112b can be accurately calculated, i.e. whether the touch position P1 is offset upwards or downwards relative to the central block 112b can be determined.

It should be noticed that although the touch blocks 112c-112j are taken as the peripheral blocks in the present exemplary embodiment, in other exemplary embodiment, the number and positions of the peripheral blocks are not limited thereto.

Figure 3:
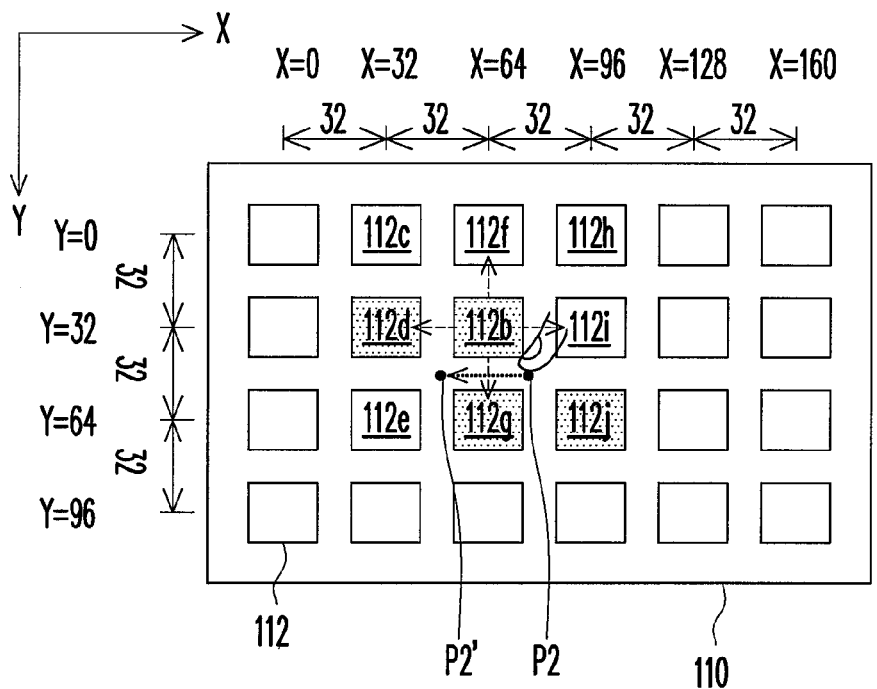
FIG. 3 is a schematic diagram illustrating a method for calculating a touch position according to another exemplary embodiment of the invention.

For example, FIG. 3 is a schematic diagram illustrating a method for calculating the touch position according to another exemplary embodiment of the invention. In FIG. 3, the peripheral blocks are, for example, four touch blocks 112f, 112g, 112d and 112i located at the top, the bottom, the left and the right of the central block 112b. Assuming when the finger 130 touches a touch position P2, the sensing values $S_{112b}$, $S_{112d}$, $S_{112g}$ and $S_{112j}$ corresponding to the touch blocks 112b, 112d, 112g and 112j are relatively great. However, since now the touch block 112j is not selected as the peripheral block, the relatively great sensing value $S_{112j}$ is neglected, so that a touch position P2' obtained according to the interpolation method is shifted compared to the actual touch position P2.

Figure 4:
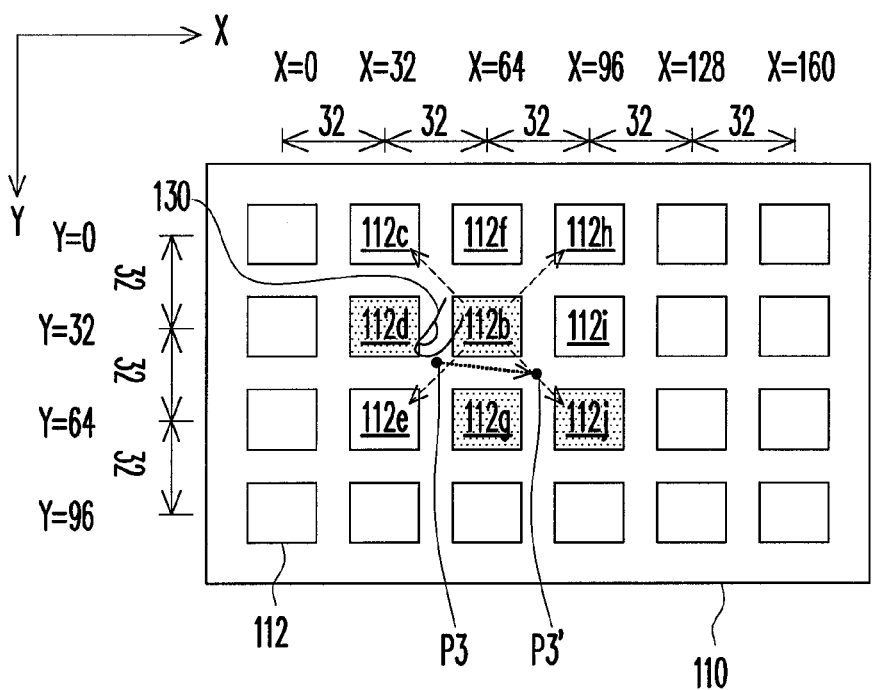
FIG. 4 is a schematic diagram illustrating a method for calculating a touch position according to another exemplary embodiment of the invention.

Moreover, as shown in FIG. 4, in another exemplary embodiment, the peripheral blocks can also be four touch blocks 112c, 112e, 112j and 112h. Assuming when the finger 130 touches a touch position P3, the sensing values $S_{112b}$, $S_{112d}$, $S_{112g}$ and $S_{112j}$ corresponding to the touch blocks 112b, 112d, 112g and 112j are relatively great. However, since now the touch blocks 112d and 112g are not selected as the peripheral blocks, the relatively great sensing values $S_{112d}$ and $S_{112g}$ are neglected, so that a touch position P3' obtained according to the interpolation method is shifted compared to the actual touch position P3.

According to the above descriptions, it is known that although selection of the peripheral blocks of the invention is not limited by the embodiment. Since relatively more peripheral blocks are considered in the calculation method of FIG. 2A and FIG. 2B, i.e. the sensing values $S_{112c}$-$S_{112j}$ corresponding to the peripheral blocks 112c-112j are all included in the coordinate calculation of the touch position P1, relatively accurate touch coordinate can be obtained.

Figure 5:
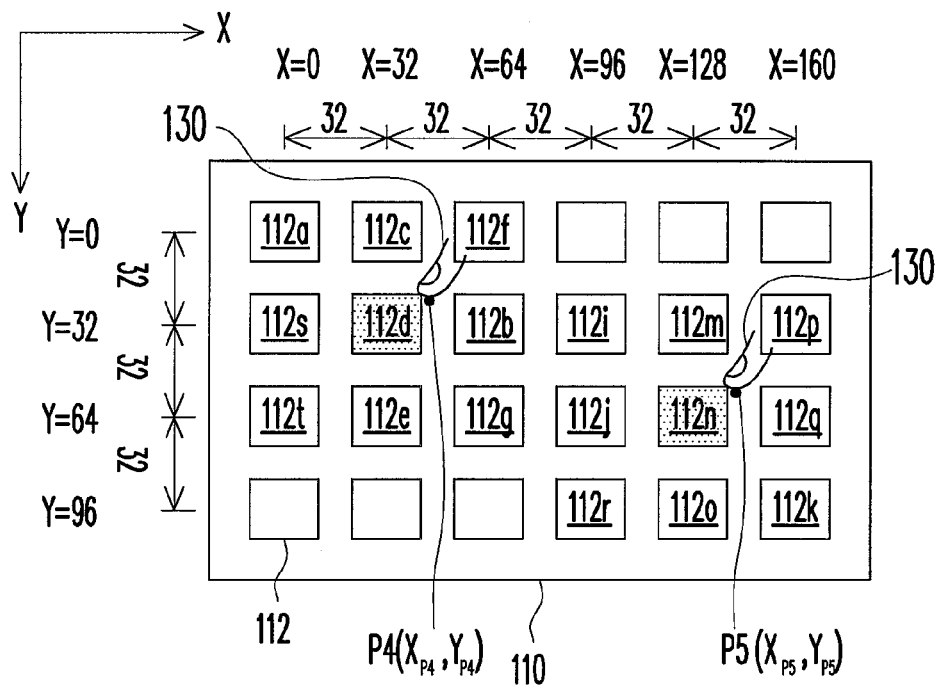
FIG. 5 is a schematic diagram illustrating a contact between a user's finger and a touch interface.

FIG. 5 is a schematic diagram illustrating a contact between the user's finger and the touch interface 110. FIG. 5 is similar to FIG. 1B, though a main difference therebetween is that the touch interface 110 of FIG. 5 is in a multi-touch state. Referring to FIG. 1B and FIG. 5, in detail, during the detecting process, the detecting unit 124 can first detect that the sensing values $S_{112d}$ and $S_{112n}$ corresponding to the touch blocks 112d and 112n are greater than the threshold value. Then, the processing unit 120 defines the touch blocks 112d and 112n as the central blocks, and selects touch blocks 112a, 112s, 112t, 112c, 112e, 112f, 112b and 112g as the peripheral blocks of the central block 112d, and selects touch blocks 112i, 112j, 112r, 112m, 112o, 112p, 112q and 112k as the peripheral blocks of the central block 112n. When a touch position P4 is calculated, the processing unit 120 can calculate the touch coordinates ($X_{P4}$, $Y_{P4}$) of the touch position P4 according to a coordinate interpolation method similar to that of FIG. 1B and FIG. 1C. For example, the X coordinate value $X_{P4}$ of the touch position P4 can be represented by:

$$X_{P4} = 32 + (S_{112b}/S_{112d})(N/F1) - (S_{112s}/S_{112d})(N/F1) + (S_{112f}/S_{112d})(N/F2) - (S_{112c}/S_{112d})(N/F2) + (S_{112g}/S_{112d})(N/F3) - (S_{112e}/S_{112d})(N/F3) \quad (5)$$

The Y coordinate value $Y_{P4}$ of the touch position P4 can be represented by:

$$Y_{P4} = 32 + (S_{112e}/S_{112d})(N/F1) - (S_{112c}/S_{112d})(N/F1) + (S_{112f}/S_{112d})(N/F2) - (S_{112a}/S_{112d})(N/F2) + (S_{112g}/S_{112d})(N/F3) - (S_{112f}/S_{112d})(N/F3) \quad (6)$$

On the other hand, when a touch position P5 is calculated, the processing unit 120 also calculates the touch coordinates ($X_{P5}$, $Y_{P5}$) of the touch position P5 according to the same coordinate interpolation method. Since those skilled in the art can learn enough instructions and recommendations of the calculation method of the touch coordinates from the descriptions of the exemplary embodiments of FIG. 1B, FIG. 1C or FIG. 2A and FIG. 2B, detailed description thereof is not repeated. Moreover, after referring to the aforementioned descriptions, those skilled in the art can deduce a calculation method of touch coordinates of more than three touch positions, so that any device or method that uses any of the aforementioned methods to calculate the touch positions are considered to be within the scope of the invention.

Figure 6:
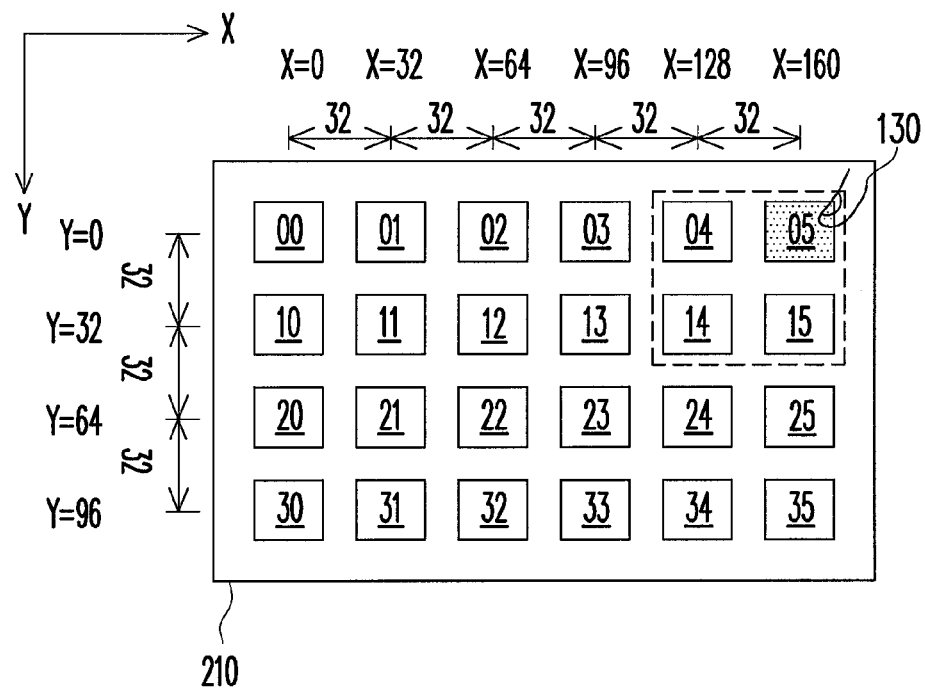
FIG. 6 is a schematic diagram illustrating a contact between a user's finger and a touch interface.
Figure 7:
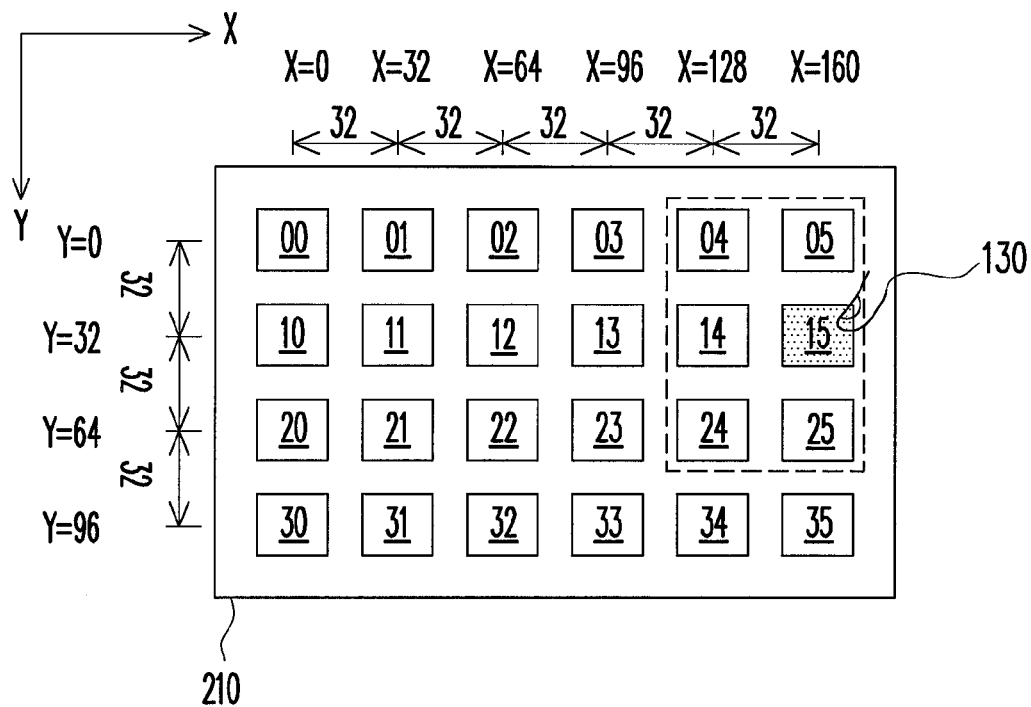
FIG. 7 is a schematic diagram illustrating a contact between a user's finger and a touch interface.
Figure 8:
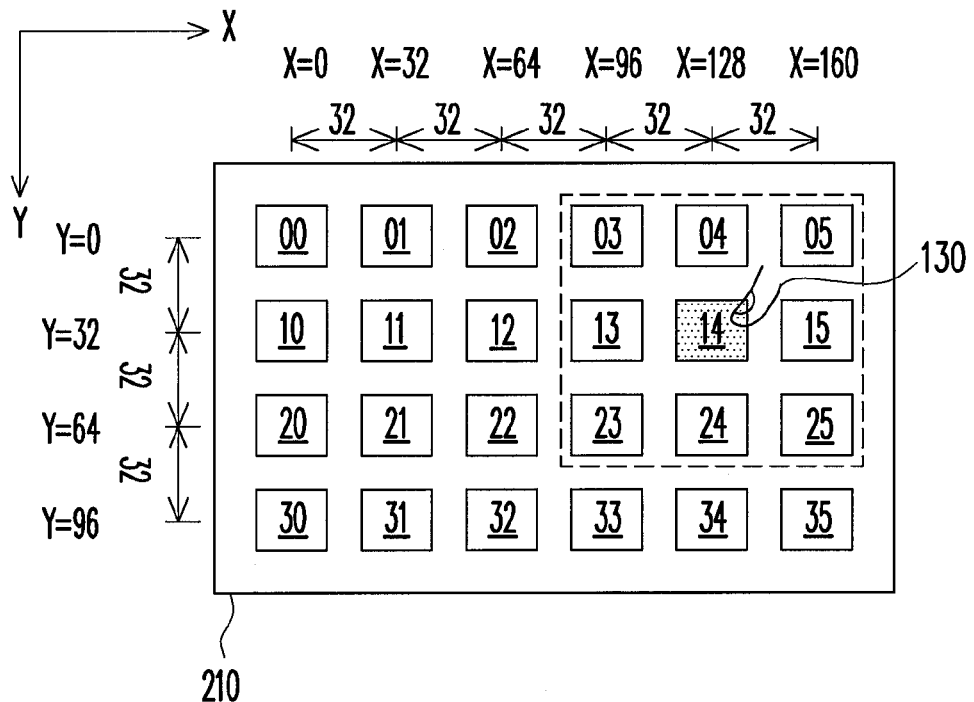
FIG. 8 is a schematic diagram illustrating a contact between a user's finger and a touch interface.

FIGS. 6-8 are schematic diagrams respectively illustrating a contact between the user's finger and a touch interface 210, wherein different touch positions correspond to different peripheral blocks for calculating touch coordinates of the touch position.

Referring to FIG. 6, when the finger 130 touches a touch block 05, the touch block 05 is defined as a central block, and the corresponding peripheral blocks thereof are, for example, touch blocks 04, 14 and 15. Namely, when the finger 130 touches a touch block located at the corner, the processing unit 120 may select three touch blocks adjacent to the central block to serve as the peripheral blocks.

Moreover, as shown in FIG. 7, when the finger 130 touches the touch block 15, the corresponding peripheral blocks of the touch block 15 are, for example, five touch blocks of 04, 14, 24, 05 and 25. Compared to FIG. 6, the peripheral blocks of FIG. 7 further include two additional touch blocks 24 and 25.

Moreover, referring to FIG. 8, when the finger 130 touches the internal touch block 14, the corresponding peripheral blocks of the touch block 14 are, for example, eight touch blocks of 03, 13, 23, 04, 24, 05, 15 and 25. Therefore, selection of the peripheral blocks can be different as a position of the central block is varied.

Figure 9:
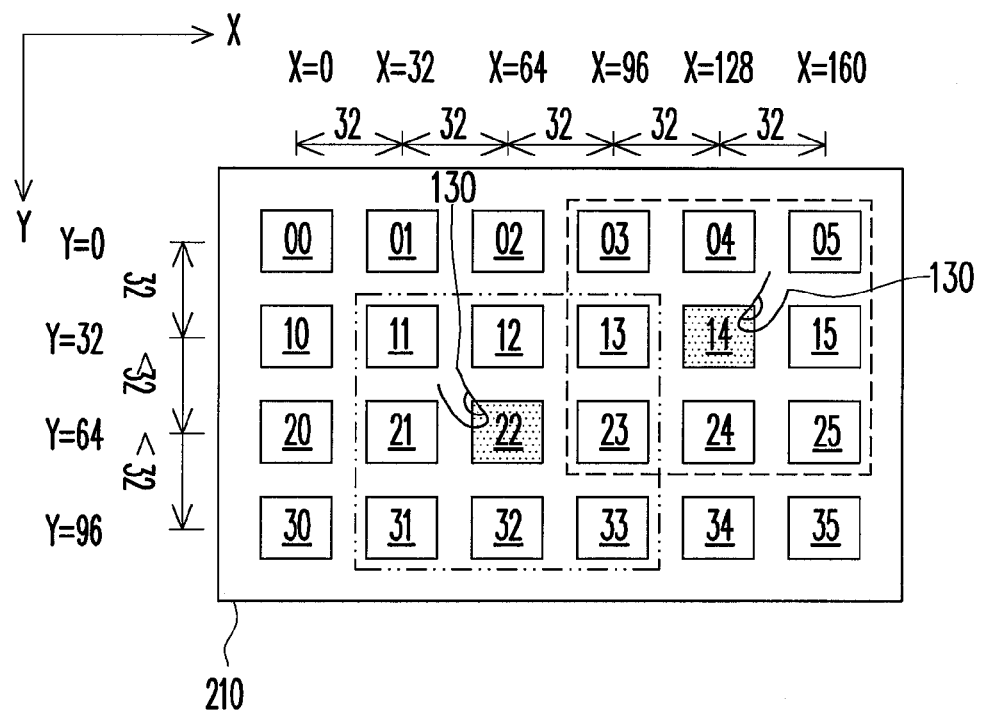
FIG. 9 is a schematic diagram illustrating a contact between a user's finger and a touch interface according to another exemplary embodiment of the invention.
Figure 10:
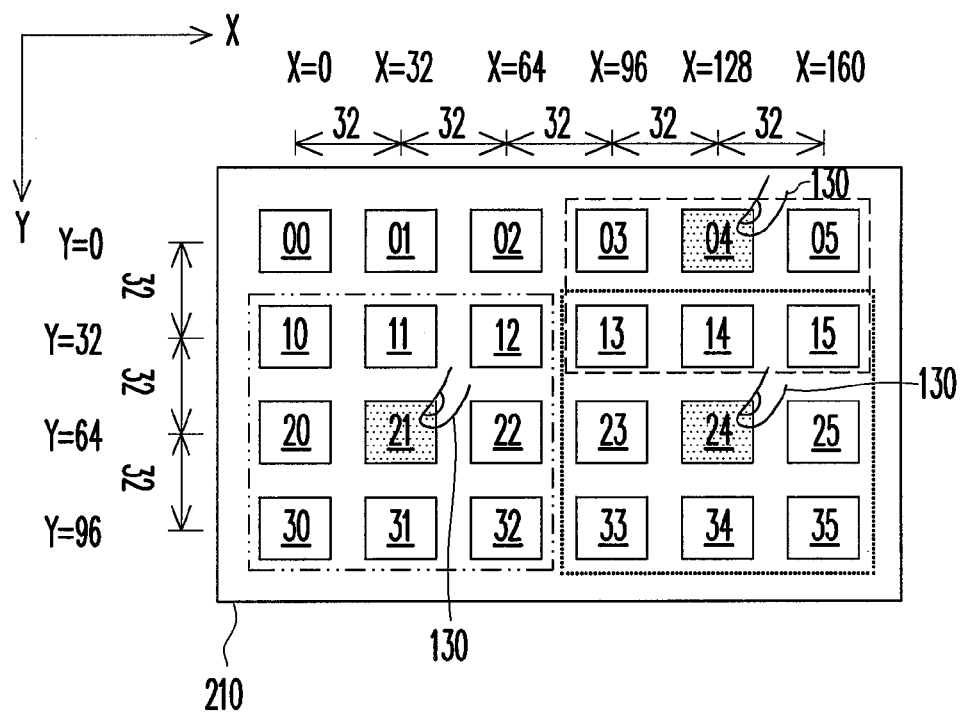
FIG. 10 is a schematic diagram illustrating a contact between a user's finger and a touch interface according to another exemplary embodiment of the invention.
Figure 11:
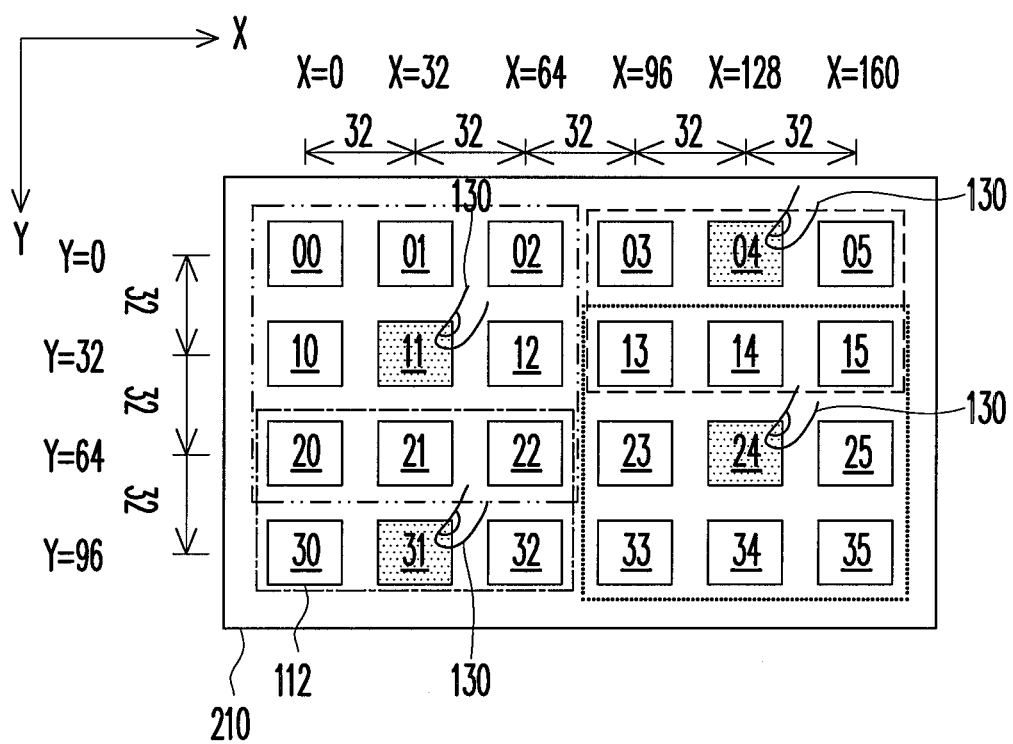
FIG. 11 is a schematic diagram illustrating a contact between a user's finger and a touch interface according to another exemplary embodiment of the invention.

FIGS. 9-11 are schematic diagrams respectively illustrating a contact between a user's finger and a touch interface. FIGS. 9-11 are similar to FIGS. 6-8, and a difference therebetween is that the touch interface 210 of FIGS. 9-11 is in a multi-touch state.

As shown in FIG. 9, when the fingers 130 simultaneously touch two touch blocks 14 and 22, the peripheral blocks corresponding to the touch block 14 are touch blocks 03, 13, 23, 04, 24, 05, 15 and 25, and the peripheral blocks corresponding to the touch block 22 are touch blocks 11, 21, 31, 12, 32, 13, 23, and 33.

Referring to FIG. 10, when the fingers 130 simultaneously touch three touch blocks 04, 21 and 24, the peripheral blocks corresponding to the touch block 04 are touch blocks 03, 13, 14, 05 and 15, the peripheral blocks corresponding to the touch block 21 are touch blocks 10, 20, 30, 11, 31, 12, 22 and 32, and the peripheral blocks corresponding to the touch block 24 are touch blocks 13, 23, 33, 14, 34, 15, 25 and 35.

Moreover, as shown in FIG. 11, when the fingers 130 simultaneously touch four touch blocks 04, 11, 24 and 31, the peripheral blocks corresponding to the touch block 11 are touch blocks 00, 10, 20, 01, 21, 02, 12 and 22, the peripheral blocks corresponding to the touch block 31 are touch blocks 20, 30, 21, 22 and 32, and the peripheral blocks corresponding to the touch blocks 04 and 24 have been mentioned before, and therefore detailed descriptions thereof are not repeated.

Figure 12:
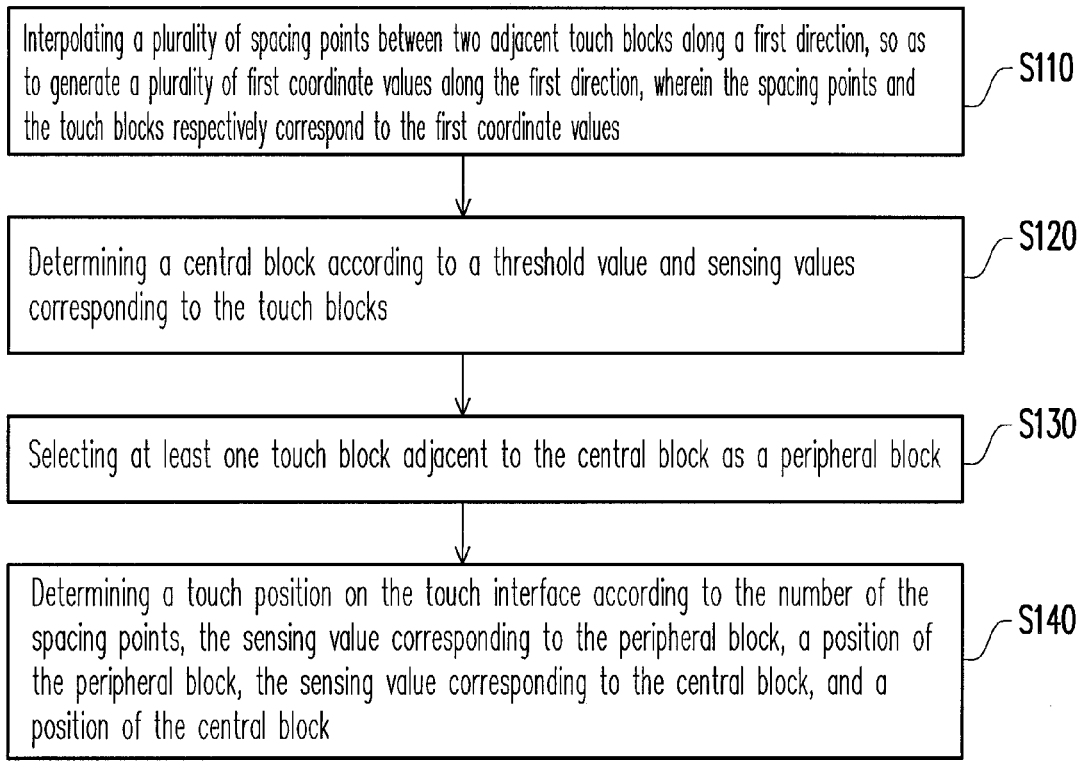
FIG. 12 is a flowchart illustrating a touch sensing method according to an exemplary embodiment of the invention.

FIG. 12 is a flowchart illustrating a touch sensing method according to an exemplary embodiment of the invention. The touch sensing method is adapted to a touch sensing system. The touch sensing system includes a touch interface, wherein the touch interface has a plurality of independent touch blocks.

Referring to FIG. 12, a plurality of spacing points is interpolated between two adjacent touch blocks along a first direction, so as to generate a plurality of first coordinate values along the first direction, wherein the spacing points and the touch blocks respectively correspond to the first coordinate values (step S110). Then, a central block is determined according to a threshold value and sensing values corresponding to the touch blocks (step S120). Then, at least one touch block adjacent to the central block is selected as a peripheral block (step S130). Finally, a touch position on the touch interface is determined according to the number of the spacing points, the sensing value corresponding to the peripheral block, a position of the peripheral block, the sensing value corresponding to the central block, and a position of the central block (step S140).

Figure 13:
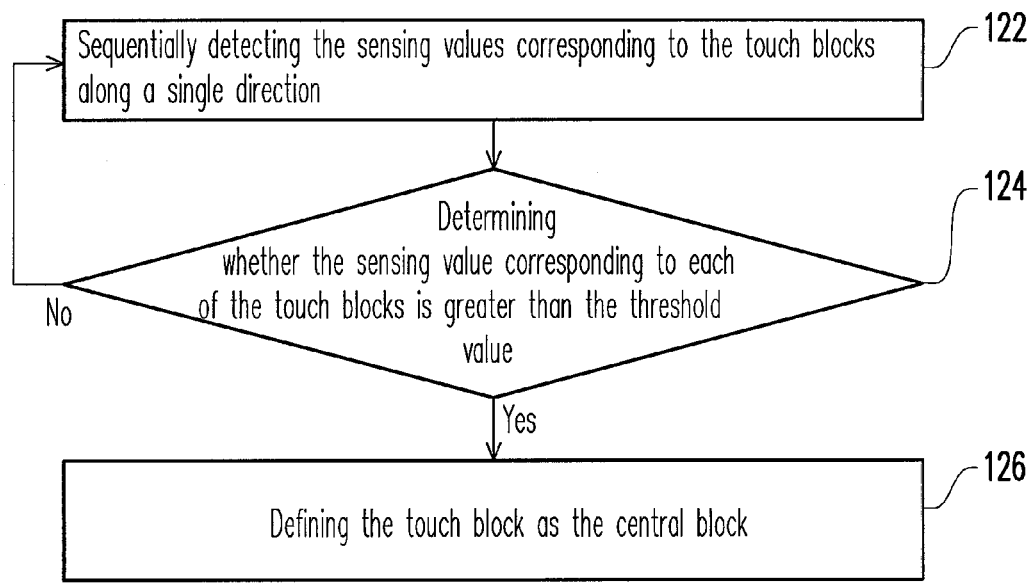
FIG. 13 is a detailed flowchart illustrating a sensing method according to another exemplary embodiment of the invention.

FIG. 13 is a detailed flowchart illustrating a sensing method according to another exemplary embodiment of the invention. In FIG. 13, the step S120 of FIG. 12 includes steps S122-S126. First, the sensing values corresponding to the touch blocks are sequentially detected along a single direction (step S122). Then, it is determined whether the sensing value corresponding to each of the touch blocks is greater than the threshold value (step S124). Finally, when the sensing value corresponding to one of the touch blocks is greater than the threshold value, the touch block is defined as the central block (step S126).

Since those skilled in the art can learn enough instructions and recommendations of the touch sensing method from the descriptions of the exemplary embodiments of FIGS. 1A-1C or FIG. 2A and FIG. 2B, detailed description thereof is not repeated.

In summary, in the embodiment of the invention, a plurality of spacing points is interpolated between two adjacent touch blocks to generate a plurality of coordinate values, and the sensing values corresponding to the touch blocks are detected in a one-dimensional sequence, so as to calculate the corresponding touch position. Therefore, the touch sensing system of the embodiments of the invention can use a simple method to achieve an effect of a fine coordinate system, so that the accuracy for determining the touch position is increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch sensing method, adapted to a touch sensing system, the touch sensing system comprising a touch interface having a plurality of independent touch blocks, and the touch sensing method comprising:
    interpolating a plurality of spacing points between two adjacent touch blocks along a first direction, so as to generate a plurality of first coordinate values along the first direction, wherein the spacing points and the touch blocks respectively correspond to the first coordinate values;
    determining a central block according to a threshold value and sensing values corresponding to the touch blocks;
    selecting at least one touch block adjacent to the central block as a peripheral block; and
    determining a touch position on the touch interface according to the number of the spacing points, the sensing value corresponding to the peripheral block, a position of the peripheral block, the sensing value corresponding to the central block, and a position of the central block.

2. The touch sensing method as claimed in claim 1, wherein a method of determining the central block comprising:
    sequentially detecting the sensing values corresponding to the touch blocks along a single direction;
    determining whether the sensing value corresponding to each of the touch blocks is greater than the threshold value; and
    defining the touch block as the central block when the sensing value corresponding to one of the touch blocks is greater than the threshold value.

3. The touch sensing method as claimed in claim 2, wherein the sensing value corresponding to the central block is the maximum among the sensing values corresponding to the touch blocks.

4. The touch sensing method as claimed in claim 1, further comprising:
dividing the touch blocks into a first group of touch block and a second group of touch block based on the central block and the touch blocks arranged along a second direction, wherein the sensing values corresponding to the touch blocks in the first group of touch block and the sensing values corresponding to the touch blocks in the second group of touch block respectively correspond to inversed operation symbols.

5. The touch sensing method as claimed in claim 4, wherein a method of calculating the touch position comprises:
determining whether the peripheral block is belonged to the first group of touch block or the second group of touch block, so as to determine an operation symbol corresponding to the peripheral block; and
determining the touch position on the touch interface according to the number of the spacing points, the sensing value corresponding to the peripheral block, the operation symbol corresponding to the peripheral block, the sensing value corresponding to the central block, and the first coordinate value corresponding to the central block.

6. The touch sensing method as claimed in claim 5, wherein the operation symbol corresponding to the touch blocks in the first group of touch block is a plus sign, and the operation symbol corresponding to the touch blocks in the second group of touch block is a minus sign.

7. The touch sensing method as claimed in claim 5, further comprising calculating the touch position on the touch interface according to a scale factor corresponding to the peripheral block.

8. The touch sensing method as claimed in claim 1, further comprising interpolating a plurality of spacing points between two adjacent touch blocks along a second direction, so as to generate a plurality of second coordinate values along the second direction, wherein the spacing points and the touch blocks respectively correspond to the second coordinate values.

9. The touch sensing method as claimed in claim 8, further comprising:
dividing the touch blocks into a third group of touch block and a fourth group of touch block based on the central block and the touch blocks arranged along the first direction, wherein the sensing values corresponding to the touch blocks in the third group of touch block and the sensing values corresponding to the touch blocks in the fourth group of touch block respectively correspond to inversed operation symbols.

10. The touch sensing method as claimed in claim 9, wherein a method of calculating the touch position comprising:
determining whether the peripheral block is belonged to the third group of touch block or the fourth group of touch block, so as to determine an operation symbol corresponding to the peripheral block; and
determining the touch position on the touch interface according to the number of the spacing points, the sensing value corresponding to the peripheral block, the operation symbol corresponding to the peripheral block, the sensing value corresponding to the central block, and the second coordinate value corresponding to the central block.

11. The touch sensing method as claimed in claim 10, wherein the operation symbol corresponding to the touch blocks in the third group of touch block is a plus sign, and the operation symbol corresponding to the touch blocks in the fourth group of touch block is a minus sign.

12. The touch sensing method as claimed in claim 10, further comprising calculating the touch position on the touch interface according to a scale factor corresponding to the peripheral block.

13. A touch sensing system, comprising:
a touch interface, having a plurality of independent touch blocks; and
a processing unit, coupled to the touch interface, and comprising an interpolating unit, wherein the interpolating unit interpolates a plurality of spacing points between two adjacent touch blocks along a first direction, so as to generate a plurality of first coordinate values along the first direction, the spacing points and the touch blocks respectively correspond to the first coordinate values, the processing unit determines a central block according to a threshold value and sensing values corresponding to the touch blocks, and selects at least one touch block adjacent to the central block as a peripheral block, and determines a touch position on the touch interface according to the number of the spacing points, the sensing value corresponding to the peripheral block, a position of the peripheral block, the sensing value corresponding to the central block, and a position of the central block.

14. The touch sensing system as claimed in claim 13, wherein the processing unit further comprises a detecting unit, the detecting unit sequentially detects the sensing values corresponding to the touch blocks along a single direction, and determines whether the sensing value corresponding to each of the touch blocks is greater than the threshold value, and when the sensing value corresponding to one of the touch blocks is greater than the threshold value, the processing unit defines the touch block as the central block.

15. The touch sensing system as claimed in claim 14, wherein the sensing value corresponding to the central block is the maximum among the sensing values corresponding to the touch blocks.

16. The touch sensing system as claimed in claim 13, wherein the processing unit divides the touch blocks into a first group of touch block and a second group of touch block based on the central block and the touch blocks arranged along a second direction, wherein the sensing values corresponding to the touch blocks in the first group of touch block and the sensing values corresponding to the touch blocks in the second group of touch block respectively correspond to inversed operation symbols.

17. The touch sensing system as claimed in claim 16, wherein the processing unit determines whether the peripheral block is belonged to the first group of touch block or the second group of touch block, so as to determine an operation symbol corresponding to the peripheral block, and determines the touch position on the touch interface according to the number of the spacing points, the sensing value corresponding to the peripheral block, the operation symbol corresponding to the peripheral block, the sensing value corresponding to the central block, and the first coordinate value corresponding to the central block.

18. The touch sensing system as claimed in claim 17, wherein the operation symbol corresponding to the touch blocks in the first group of touch block is a plus sign, and the operation symbol corresponding to the touch blocks in the second group of touch block is a minus sign.

19. The touch sensing system as claimed in claim 17, wherein the processing unit further calculates the touch position on the touch interface according to a scale factor corresponding to the peripheral block.

20. The touch sensing system as claimed in claim 13, wherein the interpolating unit further interpolates a plurality of spacing points between two adjacent touch blocks along a second direction, so as to generate a plurality of second coordinate values along the second direction, wherein the spacing points and the touch blocks respectively correspond to the second coordinate values.

21. The touch sensing system as claimed in claim 20, wherein the processing unit divides the touch blocks into a third group of touch block and a fourth group of touch block based on the central block and the touch blocks arranged along the first direction, wherein the sensing values corresponding to the touch blocks in the third group of touch block and the sensing values corresponding to the touch blocks in the fourth group of touch block respectively correspond to inversed operation symbols.

22. The touch sensing system as claimed in claim 21, wherein the processing unit determines whether the peripheral block is belonged to the third group of touch block or the fourth group of touch block, so as to determine an operation symbol corresponding to the peripheral block, and determines the touch position on the touch interface according to the number of the spacing points, the sensing value corresponding to the peripheral block, the operation symbol corresponding to the peripheral block, the sensing value corresponding to the central block, and the second coordinate value corresponding to the central block.

23. The touch sensing system as claimed in claim 22, wherein the operation symbol corresponding to the touch blocks in the third group of touch block is a plus sign, and the operation symbol corresponding to the touch blocks in the fourth group of touch block is a minus sign.

24. The touch sensing system as claimed in claim 22, wherein the processing unit calculates the touch position on the touch interface according to a scale factor of the peripheral block.

* * * * *